No. 838,975. PATENTED DEC. 18, 1906.
A. FRIEDEMANN.
HARROW.
APPLICATION FILED JUNE 7, 1906.
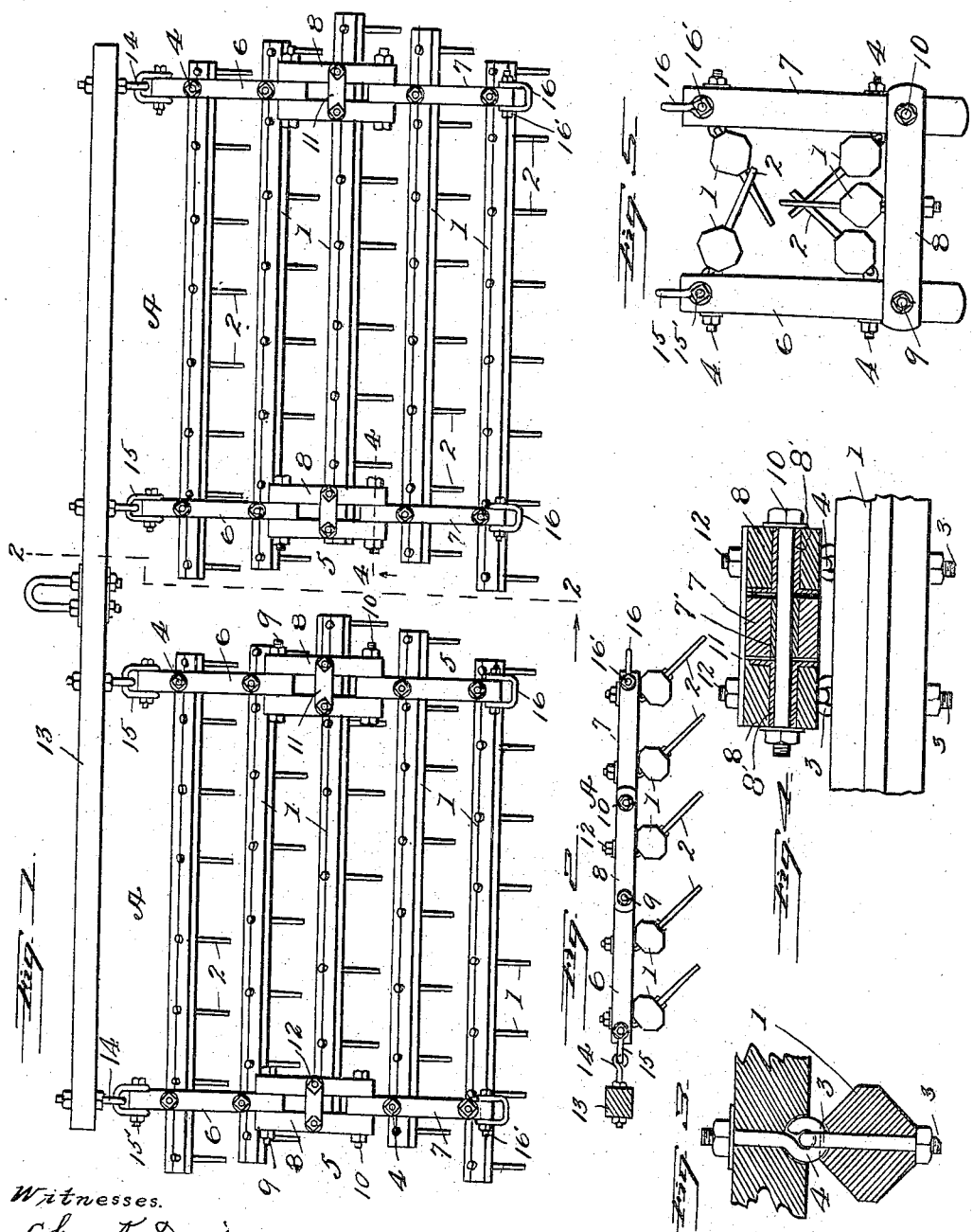

UNITED STATES PATENT OFFICE.

AUGUST FRIEDEMANN, OF WAVERLY, IOWA.

HARROW.

No. 838,975.     Specification of Letters Patent.     Patented Dec. 18, 1906.

Application filed June 7, 1906. Serial No. 320,546.

*To all whom it may concern:*

Be it known that I, AUGUST FRIEDEMANN, a citizen of the United States, and a resident of Waverly, in the county of Bremer and State of Iowa, have invented a new and useful Improvement in Harrows, of which the following is a specification.

My invention is intended particularly to improve the construction of harrows shown in my Patent No. 819,748, dated May 8, 1906, the object being the provision of an implement of this class which will possess great flexibility in operation and easily adjust itself to the nature of the ground over which it travels; which will be self-cleaning while in use and prevent clogging of the teeth of the harrow; which may be compactly and conveniently folded when not in use for transportation; which shall be efficient in operation and withal constitute a superior means for performing the requisite functions of a relatively perfect harrow.

With these and other objects in view the invention consists in an improved implement comprised of harrow-sections joined by the usual evener or draft bar, and the several harrow-sections are composed of secondary sections flexibly connected together by frame-bars, and these latter sections may include one or more toothed bars, which are in turn flexibly connected to the frame or cross bars of the harrow; and the invention further consists in certain novel features of construction and combinations and arrangements of parts, as hereinafter pointed out.

In the accompanying drawings I have illustrated one example of the physical embodiment of my invention constructed according to the best mode I have so far devised for the practical application of the principle.

Figure 1 is a top plan view of a harrow embodying the improved features of my invention. Fig. 2 is a transverse sectional view on line 2 2, Fig. 1. Fig. 3 is an enlarged detail view illustrating the flexible connection between one of the tooth-bars and a section of one of the cross-bars. Fig. 4 is a cross-section on line 4 4, Fig. 1. Fig. 5 is an end view of the harrow as it appears when in folded position ready for transportation.

In the drawings I have shown an implement composed of two sections, as A A; but it will be understood that as many sections may be coupled up and utilized as desired.

The tooth or drag bars 1 of the harrow-sections are provided with the usual teeth 2, which teeth are rigidly held in the bars, and the bars are each flexibly jointed by means of the eyebolts 3 and 4 to the sectional frame or cross bars of the harrow. The bolts 3 and 4 are each firmly embedded in their respective bars and secured by nuts, and the eyes of the bolts are looped together to form hinged or swinging joints.

The tooth-bars are fashioned in cross-section, as in my patent above referred to, and are jointed to the sectional cross-bars to permit a forward or rearward swinging movement, so that the harrow may be reversed conveniently, the teeth in all cases standing normally at an angle of forty-five degrees when the harrow is working, and the staggered relation of the tooth-bars to the frame or cross bars insures a proper line of travel of the drag-teeth.

The frame or cross bars 5 of the harrow, as illustrated, are constructed in sections, in this instance the frame-bars being shown as composed of three members or sections. In Fig. 1 the front sections or members of the frame-bars each consists of a short bar, as 6, and the rear sections or members are composed of short bars 7. These bars 6 and 7 are each flexibly connected together by the intermediate sections 8, which latter sections consist of a pair of parallel bars having bolts 9 and 10 passed through the ends thereof, and these bolts also pass through holes at the inner ends of the bars 6 and 7 and are secured by nuts, thus providing hinged joints at the ends of the intermediate members of the frame or cross bar.

To reduce frictional wear on the wooden parts at the joints, I provide metallic thimbles, as 6' and 7', on the front and rear bars, respectively, and similar thimbles 8' on the ends of the bars of the intermediate sections. These thimbles are inserted in openings in the ends of the wooden bars and form journals for the bolts 9 and 10.

A stay-plate 11 may be secured to the two bars of the intermediate section 8 by bolts 12 12 to secure rigidity of the members.

As will be observed from the drawings, the front and rear sections of the cross or frame bars have connected thereto each a pair of tooth-bars, and the intermediate sections of the frame-bars have a single toothed bar jointed thereto.

The draft-bar or evener 13 may be connected at either end of the harrow-sections by means of the hooks 14, which are adapted to connect with the clevises 15 at the front end of the harrow in Fig. 1 or with similar clevises 16 at the rear end in said figure, these clevises being pivotally secured at the outer ends of the sectional cross or frame bars by bolts 15' and 16', respectively, and secured by nuts, as usual.

When it is desired to reverse the travel of the implement, the evener 13 may be attached to the clevises 16, and a pull on the evener by a team of horses will cause the drag or tooth bars to swing on their hinged joints, (bolts 3 and 4,) and the teeth 1 will incline in reverse direction to that of their former inclination.

In Fig. 5 the harrow is illustrated in folded and compact position for transportation, and when so folded the implement may be conveniently loaded upon a wagon. In folding the sections of the harrow the sectional cross-bars are folded under, the tooth-bars being partly inclosed by the sections of the cross-bars, and the teeth on the tooth-bars point inwardly, rendering the folded harrow convenient in handling.

In the drawings I have illustrated the intermediate members of the sectional cross-bars with one tooth-bar attached and each of the two outer members of the cross-bar with two tooth-bars jointed thereto; but it is obvious that this arrangement may be varied as desired.

The rocking of the separate sections of the harrow formed by the sectional cross-bars makes the device self-cleaning and prevents the accumulation of cornstalks, &c., to clog the teeth of the harrow.

The tooth-bars by means of their beveled upper edges (shown in cross-section) and the connection of the eyebolts 3 and 4 permit the harrow-teeth to slant in either of two directions at an angle of forty-five degrees to the perpendicular, depending upon the side to which the draft-team is hitched.

The construction whereby the two pairs of outer tooth-bars are each connected in pairs to the two outer members of the cross-bars secures a flexible cross-bar and permits the harrow to adjust itself to the nature of the ground being worked.

From the above description, taken in connection with the drawings, it is evident that I have produced an implement which fulfils the conditions set forth as the objects and purposes of my invention.

What I claim is—

1. In a harrow, the combination with a draft-bar, of a plurality of sectional frame-bars extending transversely thereto, bolts passed through the adjoining ends of the sections of the frame-bars, and wearing-thimbles surrounding said bolts, and toothed bars connected with the sections of the frame-bars.

2. The combination with a draft-bar of a plurality of hinged sectional frame-bars, a series of toothed bars located in planes parallel with the draft-bar, and flexible joints consisting of eyebolts passed through the bars and having their eyes looped together.

3. In a harrow the combination with a plurality of flexible frame-bars, of a series of toothed bars each having its upper edges beveled, and a flexible connection between said frame-bars and toothed bars, whereby the swinging movement of the latter is limited by the beveled edges.

4. In a harrow, the combination with sectional cross or frame bars, of a tooth-bar connected with the intermediate section of the frame-bars, and two toothed bars connected to each of the outer sections of the sectional cross-bars, substantially as set forth.

5. In a harrow, the combination of a plurality of frame-bars and one or more tooth-bars each connected pivotally to the under side of the frame-bars so that it may swing in relation to said frame-bars so as to permit the teeth of said toothed bars to point at a rearward angle in either direction of motion of the harrow, the said toothed bars being shaped so as to rest against the under sides of the frame-bars when the teeth are in the proper working position.

6. In a harrow, a section comprising in combination a plurality of flexible frame-bars each consisting of a plurality of sections pivotally connected together, two toothed bars connected to opposite sections of said frame-bars, a single toothed bar connected to opposite intermediate sections of said frame-bars, and two toothed bars connected to another opposite set of sections of said frame-bars.

7. In a harrow, a section comprising two frame-bars each consisting of two end pieces and a center piece pivotally connected with each of the end pieces, two toothed bars having a swinging connection with each two corresponding end pieces of said frame-bars, and a single toothed bar having a swinging connection with the intermediate pieces of said frame-bars.

8. In a harrow, a section comprising in combination two toothed bars; two frame members, to each of which both of said bars are connected by means of eyebolts permitting the bars to swing in relation to the frame members; two other toothed bars and two other frame members to which said toothed bars are similarly connected, and two intermediate frame members each consisting of two pieces connected together, between the ends of which the inner ends of the corresponding two frame members first mentioned lie, and to which they are pivotally connected and a single toothed bar connected in a similar manner to said intermediate frame members.

9. In a harrow the combination of a draft-bar and one or more reversible harrow-sections to which said draft-bar may be connected at either end by readily-removable attachments, each of said sections comprising in combination a plurality of toothed bars connected together near each end by a cross-bar so that they may have a certain forward-and-backward movement in relation to said cross-bars; another plurality of toothed bars similarly connected near each end by two other cross-bars; a single toothed bar connected near each end in a similar manner to one of two other cross-bars; the said cross-bars to which said single toothed bar is connected being placed intermediate the corresponding cross-bars to each of which a plurality of toothed bars is connected, and pivotally linked to said bars.

10. In a harrow, a toothed-bar section comprising three minor sections of which the two outer sections consist of two toothed bars each connected by a plurality of rigid cross-bars, and the inner section consists of a single toothed bar connected to a plurality of intermediate cross-bars, the intermediate cross-bars being pivotally connected to the outer cross-bars.

In testimony whereof I have affixed my signature in the presence of two witnesses.

AUGUST FRIEDEMANN.

Witnesses:
F. E. FARWELL,
F. P. HAGEMANN.